US008605652B1

(12) United States Patent  (10) Patent No.: US 8,605,652 B1
Singh et al.  (45) Date of Patent: Dec. 10, 2013

(54) WIRELESS TUNE AWAY BASED UPON CONGESTION

(75) Inventors: Jasinder Pal Singh, Olathe, KS (US); Anthony Kit-yui Leung, Kansas City, MO (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 692 days.

(21) Appl. No.: 12/765,160

(22) Filed: Apr. 22, 2010

(51) Int. Cl.
*H04W 4/00* (2009.01)
(52) U.S. Cl.
USPC .......................................................... 370/328
(58) Field of Classification Search
None
See application file for complete search history.

(56) References Cited

U.S. PATENT DOCUMENTS

| | | | |
|---|---|---|---|
| 6,507,743 B1 | 1/2003 | Abrishamkar et al. | |
| 6,650,912 B2 | 11/2003 | Chen et al. | |
| 6,771,616 B2 | 8/2004 | Abrishamkar et al. | |
| 6,829,485 B2 | 12/2004 | Abrishamkar et al. | |
| 6,895,058 B2 | 5/2005 | Abrishamkar et al. | |
| 2001/0044313 A1 | 11/2001 | Abrishamkar | |
| 2003/0152049 A1* | 8/2003 | Turner | 370/331 |
| 2005/0245253 A1* | 11/2005 | Khushu et al. | 455/423 |
| 2006/0056367 A1* | 3/2006 | Marinier et al. | 370/338 |
| 2006/0176870 A1 | 8/2006 | Joshi et al. | |
| 2006/0183441 A1* | 8/2006 | Irie et al. | 455/115.1 |
| 2007/0072643 A1 | 3/2007 | Jiang et al. | |
| 2007/0097922 A1* | 5/2007 | Parekh et al. | 370/332 |
| 2007/0258436 A1 | 11/2007 | Kulkarni et al. | |
| 2008/0198811 A1 | 8/2008 | Deshpande et al. | |
| 2008/0287126 A1* | 11/2008 | Kuo | 455/432.1 |
| 2009/0141689 A1 | 6/2009 | Parekh et al. | |
| 2011/0143753 A1* | 6/2011 | Rahman et al. | 455/432.1 |

* cited by examiner

*Primary Examiner* — Otis L Thompson, Jr.

(57) ABSTRACT

What is disclosed is a method of operating a wireless communication device. The method includes entering a first wireless communication mode with a wireless access node that requires tuning to a first frequency spectrum, and receiving congestion information of the wireless access node for overhead communications of the first wireless communication mode. In response to entering the first wireless communication mode, the method includes setting a timer for monitoring a second wireless communication mode based on the congestion information. When the timer expires, the method includes tuning away from the first frequency spectrum to a second frequency spectrum for the second wireless communication mode and monitoring information for the second wireless communication mode.

18 Claims, 5 Drawing Sheets

WIRELESS TUNE AWAY BASED UPON CONGESTION

TECHNICAL FIELD

Aspects of the disclosure are related to the field of communications, and in particular, tune away of wireless communication devices in wireless communication networks.

TECHNICAL BACKGROUND

Wireless communication systems typically include wireless access systems, with equipment such as base stations, which provide wireless access to communication services for user devices over wireless links. A typical wireless communication system includes systems to provide wireless access across a geographic region, with wireless coverage areas associated with individual base stations. The wireless access systems exchange user communications and overhead communications between wireless communication devices and a core network of the wireless communication system.

The wireless communication system also typically transfers information to the user devices to indicate incoming voice calls, text messages, network alerts, or other alerts and messages. This information, often referred to as network information or paging information, is routed through the wireless access system to reach the wireless communication devices via special wireless communication channels, frequencies, or timeslots. Wireless communication devices can include devices which support multiple communication modes, such as multiple wireless communication protocols. These multi-mode wireless communication devices often must receive the network information over a specific wireless communication mode, even when communicating in a different wireless communication mode. However, when many wireless communication devices communicate with the wireless access system, the special wireless communication channels, frequencies, or timeslots used for transferring network or paging information can become congested.

OVERVIEW

What is disclosed is a method of operating a wireless communication device. The method includes entering a first wireless communication mode with a wireless access node that requires tuning to a first frequency spectrum, and receiving congestion information of the wireless access node for overhead communications of the first wireless communication mode. In response to entering the first wireless communication mode, the method includes setting a timer for monitoring a second wireless communication mode based on the congestion information. When the timer expires, the method includes tuning away from the first frequency spectrum to a second frequency spectrum for the second wireless communication mode and monitoring information for the second wireless communication mode.

What is also disclosed is a wireless communication device. The wireless communication device includes a processing system configured to enter a first wireless communication mode with a wireless access node that requires tuning a transceiver to a first frequency spectrum. The transceiver is configured to receive congestion information of the wireless access node for overhead communications of the first wireless communication mode. In response to entering the first wireless communication mode, the processing system is configured to set a timer for monitoring a second wireless communication mode based on the congestion information, and when the timer expires, the transceiver is configured to tune away from the first frequency spectrum to a second frequency spectrum for the second wireless communication mode and the processing system is configured to monitor information for the second wireless communication mode.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
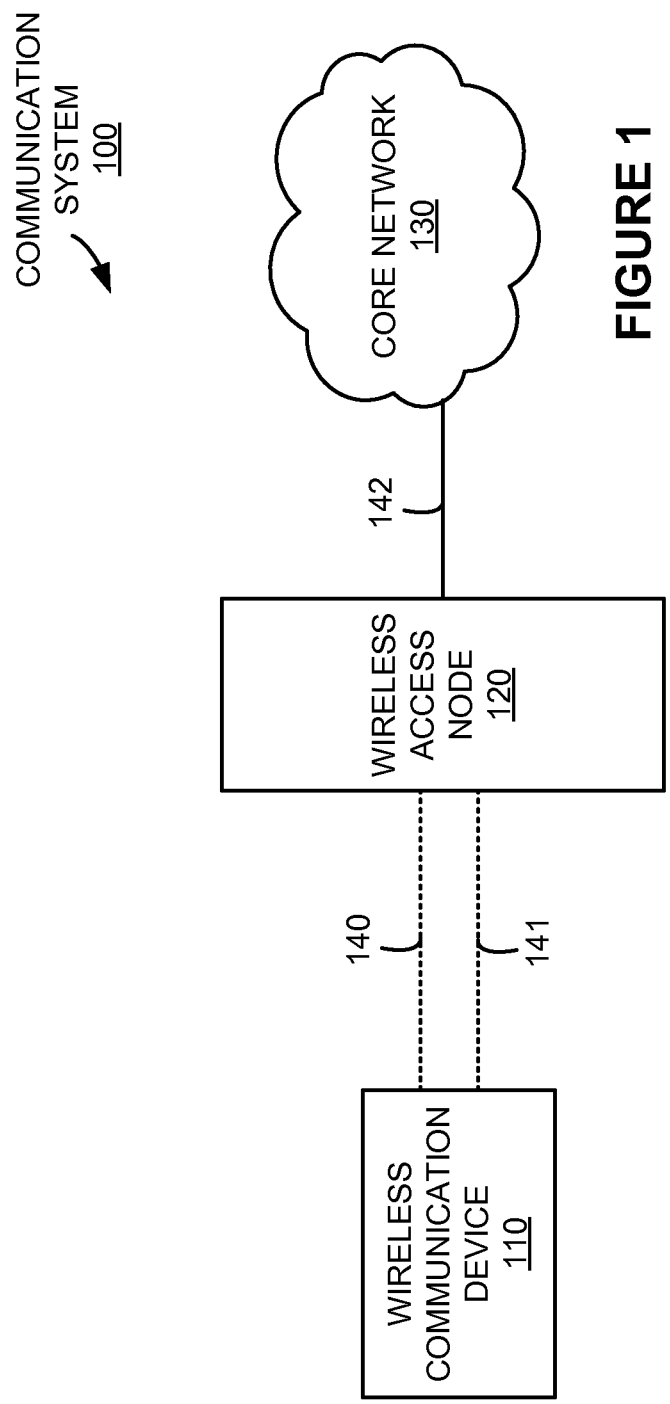
FIG. 1 is a system diagram illustrating a communication system.

FIG. 1 is a system diagram illustrating communication system 100. Communication system 100 includes wireless communication device 110, wireless access node 120, and core network 130. Wireless communication device 110 and wireless access node 120 communicate over wireless links 140-141. Wireless access node 120 and core network 130 communicate over link 142. Wireless communication device 110 receives wireless service through wireless access node 120, which could include accessing communication services of core network 130, or exchanging communications with systems of core network 130. Wireless access node 120 provides wireless service to wireless communication device 110 using a first wireless communication mode over wireless link 140 and using a second wireless communication mode over wireless link 141.

Figure 2:
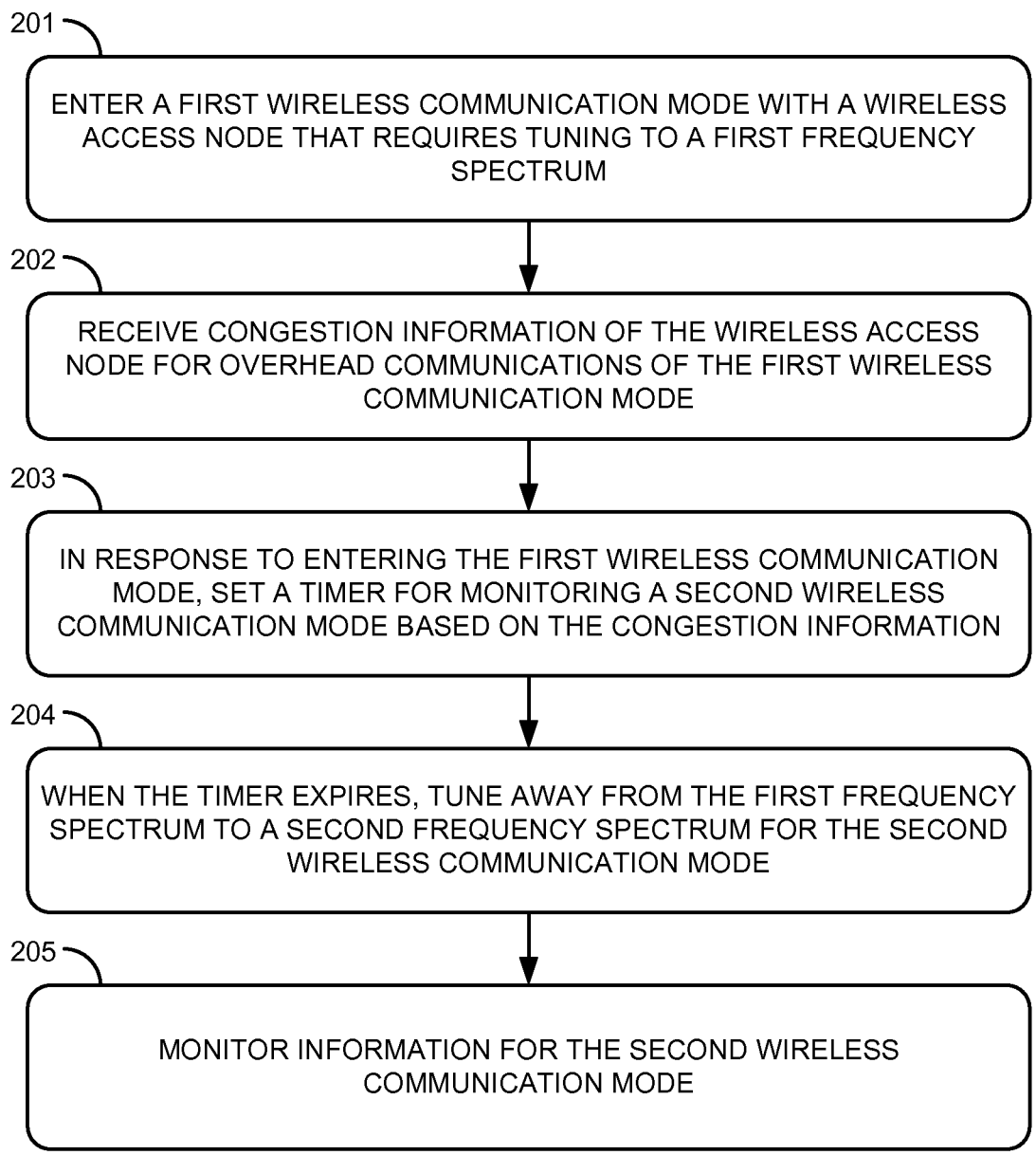
FIG. 2 is a flow diagram illustrating a method of operation of a wireless communication device.

FIG. 2 is a flow diagram illustrating a method of operation of wireless communication device 110. The operations of FIG. 2 are referenced herein parenthetically. In FIG. 2, wireless communication device 110 enters (201) a first wireless communication mode with wireless access node 120 that requires tuning to a first frequency spectrum. In this example, the first communication mode is provided over a first frequency spectrum represented by wireless link 140, where wireless communication device 110 tunes to the first frequency spectrum for communication over wireless link 140. The first communication mode could include where wireless communication device 110 is registered for communication service with wireless access node 120 and is engaging in user communications through wireless access node 120. In other examples, entering the first communication mode includes entering an active state, where user data or user traffic is presently being exchanged between wireless communication device 110 and wireless access node 120 in the first wireless communication mode. In further examples, entering the first communication mode could include entering into a voice call, engaging in a data session, transferring data, watching a video, running an application, or other activity state on wireless communication device 110 using the first communication mode.

Wireless communication device 110 receives (202) congestion information of wireless access node 120 for overhead communications of the first wireless communication mode. In this example, the congestion information is received over wireless link 140 from wireless access node 120. In other examples, the congestion information could be received from other wireless access nodes or over different wireless links. The congestion information could include control channel occupancy information of wireless access node 120 for the overhead communications of the first wireless communication mode. In many examples, multiple wireless communication devices are in communication with wireless access node 120, and overhead communications transferred by wireless access node 120, such as scheduling information, timing information, paging information, text messaging, network alerts, or other overhead communications, could become congested when user communications of the wireless communication devices increases.

In response to entering the first wireless communication mode, wireless communication device 110 sets (203) a timer for monitoring a second wireless communication mode based on the congestion information. In this example, the second communication mode is provided over wireless link 141. The first and second wireless communication modes could include different communication modes, or similar communication modes. For example, the first wireless communication mode could include communicating over a first wireless link using a first wireless communication protocol that uses a first frequency spectrum, while the second wireless communication mode could include communicating over a second wireless link using a second wireless communication protocol that uses a second frequency spectrum, although other configurations could be employed. The timer for monitoring the second wireless communication mode could be determined by increasing the timer from a present value when the congestion information indicates congestion above a congestion threshold, or decreasing the timer from a present value when the congestion information indicates congestion below a congestion threshold. Multiple congestion thresholds could be employed for increasing or decreasing the timer. In further examples, a default timer is employed, and the default timer is modified based upon the congestion information.

When the timer expires, wireless communication device 110 tunes away (204) from the first frequency spectrum to a second frequency spectrum for the second wireless communication mode, and wireless communication device 110 monitors (205) information for the second wireless communication mode. In this example, the second communication mode is provided over a second frequency spectrum represented by wireless link 141, where wireless communication device 110 tunes to the second frequency spectrum for communication over wireless link 141. The information monitored by wireless communication device 110 for the second wireless communication mode could include network information, network alerts, paging information, pages, call alerts, channel assignments, access parameter messages (APM), system parameter messages (SPM), extended channel assignment messages (ECAM), handoff information, or other information for the second wireless communication mode.

Figure 3:
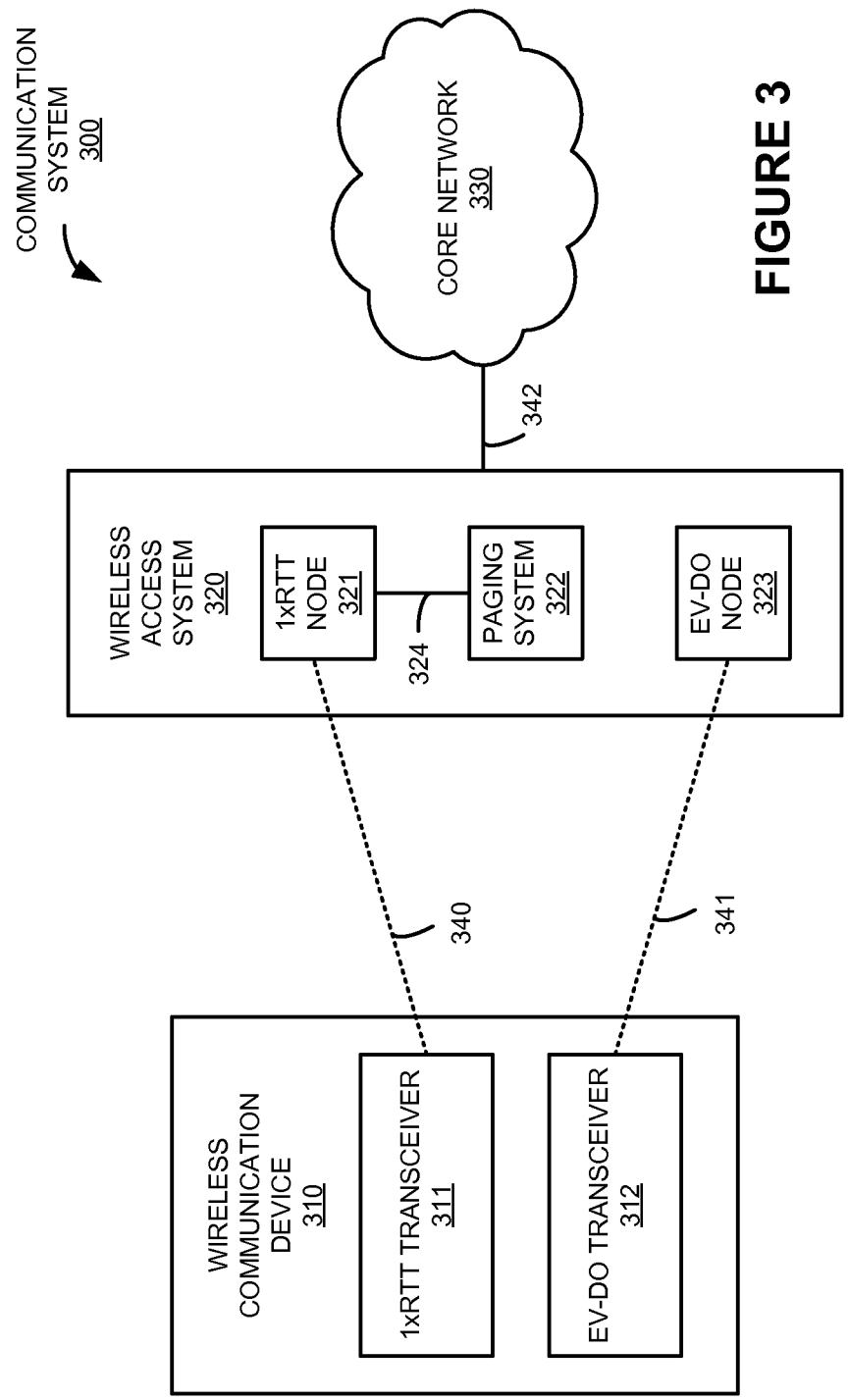
FIG. 3 is a system diagram illustrating a communication system.

FIG. 3 is a system diagram illustrating communication system 300. Communication system 300 includes wireless communication device 310, wireless access system 320, and core network 330. Wireless communication device 310 and wireless access system 320 communicate over wireless links 340 and 341. Wireless access system 320 and core network 330 communicate over link 342. Link 342 comprises a Metropolitan Area Network (MAN) link in this example.

Wireless communication device 310 comprises a mobile smartphone in this example. Wireless communication device 310 includes single-carrier radio transmission technology link (1xRTT) transceiver 311 and Evolution-Data Optimized (EV-DO) transceiver 312, although other examples could use a different configuration. 1xRTT transceiver includes transceiver circuitry and an antenna. 1xRTT transceiver communicates with 1xRTT node 321 of wireless access system 320 over wireless link 340 using the Code Division Multiple Access (CDMA) single-carrier radio transmission technology (1xRTT) wireless protocol. EV-DO transceiver 312 includes transceiver circuitry and an antenna. EV-DO transceiver 312 communicates with EV-DO node 323 of wireless access system 320 over wireless link 341 using the Evolution Data Optimized (EV-DO) wireless protocol. In some examples, transceiver circuitry or an antenna is shared between 1xRTT transceiver 311 and EV-DO transceiver 312. Although one wireless communication device is shown in FIG. 3, it should be understood that a different number of wireless communication devices could be in communication with wireless access system 320.

Wireless access system 320 includes wireless access equipment and systems of a wireless communications provider in this example. Wireless access system 320 includes 1xRTT node 321, paging system 322, and EV-DO node 323, although other examples could use a different configuration. 1xRTT node 321 includes a base station and associated systems for communicating using the 1xRTT protocol and frequency spectrum, and EV-DO node 323 includes a base station and associated systems for communicating using the EV-DO protocol and frequency spectrum. 1xRTT node 321 receives paging information over link 324 from paging system 322. Paging system 322 includes equipment to determine paging information for delivery to 1xRTT node 321. In some examples, the paging information could be received from core network 330, while in other examples, the paging information could originate in paging system 322. The paging information could include call alerts, text messages, audio messages, network alerts, or other information for 1xRTT node 321. Wireless access system 320 also includes routers, gateways, or other related equipment for exchanging communications between wireless communication device 310 and core network 330 over link 342. Although wireless access system 320 includes only one of 1xRTT node 321, paging system 322, and EV-DO node 323 in FIG. 3, it should be understood that a different number could be employed, such as in examples where wireless access system 320 provides wireless access over a geographic area. Core network 330 is a core network of the wireless communications provider in this example. Core network 330 could include further wireless access systems, base stations, access control systems, routers, gateways, or other equipment and systems, and could communicate over the Internet or other networks with further systems.

Figure 4:
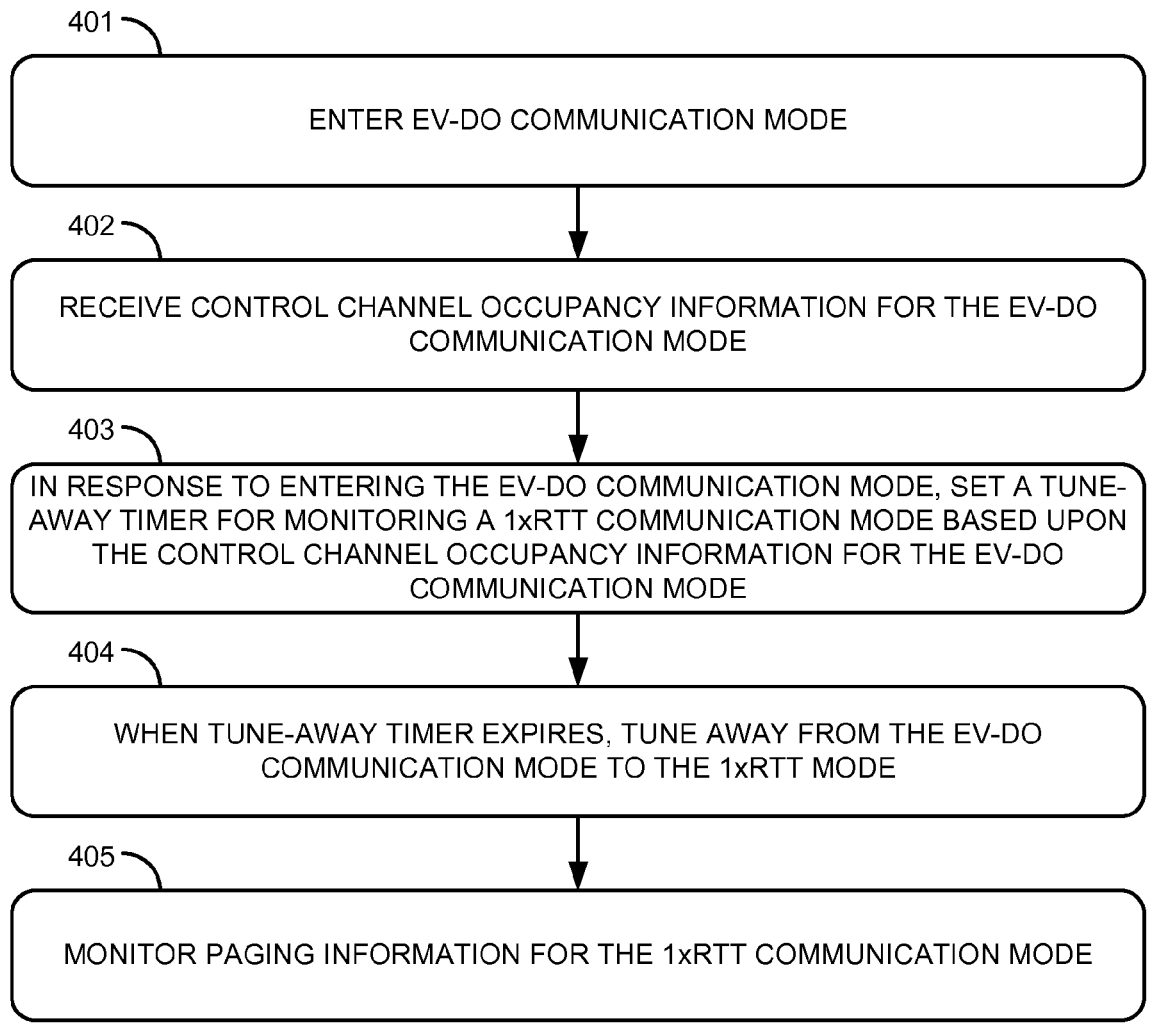
FIG. 4 is a flow diagram illustrating a method of operation of a wireless communication device.

FIG. 4 is a flow diagram illustrating a method of operating wireless communication device 310. The operations of FIG. 4 are referenced herein parenthetically. In FIG. 4, wireless communication device 310 enters (401) EV-DO communication mode over wireless link 341. In this example, wireless link 341 uses the EV-DO wireless protocol and frequency spectrum, and EV-DO transceiver 312 of wireless communication device 310 communicates over wireless link 341 with EV-DO node 323 of wireless access system 320. In addition to entering into the EV-DO communication mode, wireless communication device 310 could also exchange user communications using the EV-DO communication mode. The user communications could comprise a data transfer, voice call, voice over IP (VoIP) call, video stream, e-book download, music stream, video game communication, among other user communications.

Wireless communication device 310 receives (402) control channel occupancy information for the EV-DO communication mode. In this example, the control channel occupancy information is received over wireless link 341 from EV-DO node 323 of wireless access system 320. In other examples, the control channel occupancy information could be received from other nodes or over different wireless links. The control channel occupancy information could include information indicating an occupancy level of a control channel associated with EV-DO node 323 or wireless link 341. The occupancy can refer to a level of traffic carried by the control channel, a number of wireless communication devices using the control channel, a queue level of communications waiting for transfer over a control channel, among other information. In many examples, multiple wireless communication devices are in communication with EV-DO node 323, and overhead communications transferred by EV-DO node 323 in a control channel, such as scheduling information, timing information, paging information, text messaging, network alerts, or other overhead communications, could increase in volume and experience congestion. Increased volumes of user communications of the wireless communication devices can also increase control channel occupancy, such as by using up bandwidth of a wireless link for the user communications instead of for the control channel communications. In the EV-DO example as shown in FIG. 3, the control channel occupancy information could include occupancy information for control channels of a forward link portion of wireless link 341. The portion of wireless link 341 as transmitted by wireless communication device 310 is referred to an uplink or reverse link of the wireless link, while the portion as transmitted by EV-DO node 323 is referred to as a downlink or forward link of the wireless link. The overhead information transferred over control channels or control timeslots can become heavily loaded or congested when many wireless communication devices are in communication with EV-DO node 323, or when a few wireless communication devices exchange a high amount of communications. Other wireless protocols or communication modes could include different overhead communication congestion information. It should be understood that a control channel could include a frequency, timeslot, code-division channel, among other channel differentiators.

In response to entering the EV-DO communication mode, wireless communication device 310 sets (403) a tune-away timer for monitoring 1xRTT communication mode based upon the control channel occupancy information for the EV-DO communication mode. In this example, the tune-away timer is a recurring periodic interval which indicates to wireless communication device 310 when to check for information over wireless link 340 from 1xRTT node 321. Wireless communication device 310 could be engaging in other activities when the tune-away timer expires. For example, wireless communication device 310 could be engaging in user communications over wireless link 341 via a user communications frequency spectrum, frequency band, communication channel, or timeslot, and when the tune-away timer expires, wireless communication device 310 would tune away to a different frequency spectrum, frequency band, communication channel, or timeslot to monitor the paging information. The tune-away timer could be a default, or network default, monitoring interval. In some examples, the tune-away timer is initially set to 5.12 seconds, where wireless communication device 310 periodically monitors for network or overhead information upon each expiration of the tune-away timer. In this example, the control channel occupancy information is processed to determine the tune-away timer. For example, the tune-away timer could be increased from a present value when the control channel occupancy information exceeds a congestion threshold, and could be decreased from a present value when the control channel occupancy information drops below a congestion threshold. Multiple congestion thresholds for the control channel occupancy information could be employed for increasing and decreasing the tune-away timer. The congestion threshold could include a level of control channel occupancy, a number of wireless communication devices using the control channel, a level of overhead communications using the control channel, among other thresholds. In other examples, the tune-away timer is also or alternatively determined based upon an activity level, application state, application type, speed of motion, time of motion, idle state, handoff rate, handoff status, or other state of wireless communication device 310.

When the tune-away timer expires, wireless communication device 310 tunes away (404) from the EV-DO communication mode to the 1xRTT communication mode, and wireless communication device 310 monitors (405) paging information for the 1xRTT communication mode over wireless link 340. In this example, 1xRTT transceiver 311 of wireless communication device 310 monitors for the paging information transferred by paging system 322 through 1xRTT node 321 of wireless access system 320. The 1xRTT protocol is employed over wireless link 340, using the 1xRTT frequency spectrum. The paging information could include pages, call alerts, network alerts, audio messages, text messages, multimedia messages, or other paging information. In further examples, different information could be monitored for the 1xRTT communication mode over wireless link 340, such as channel assignments, access parameter messages (APM), system parameter messages (SPM), extended channel assignment messages (ECAM), handoff information, or other information. Also in this example, tuning away from the EV-DO communication mode to the 1xRTT communication mode includes halting communications which use the EV-DO communication mode and initiating communications over the 1xRTT communication mode. It should be understood that other wireless protocols or wireless communication modes could employ similar operations as the 1xRTT/EV-DO example discussed above for FIG. 4.

Figure 5:
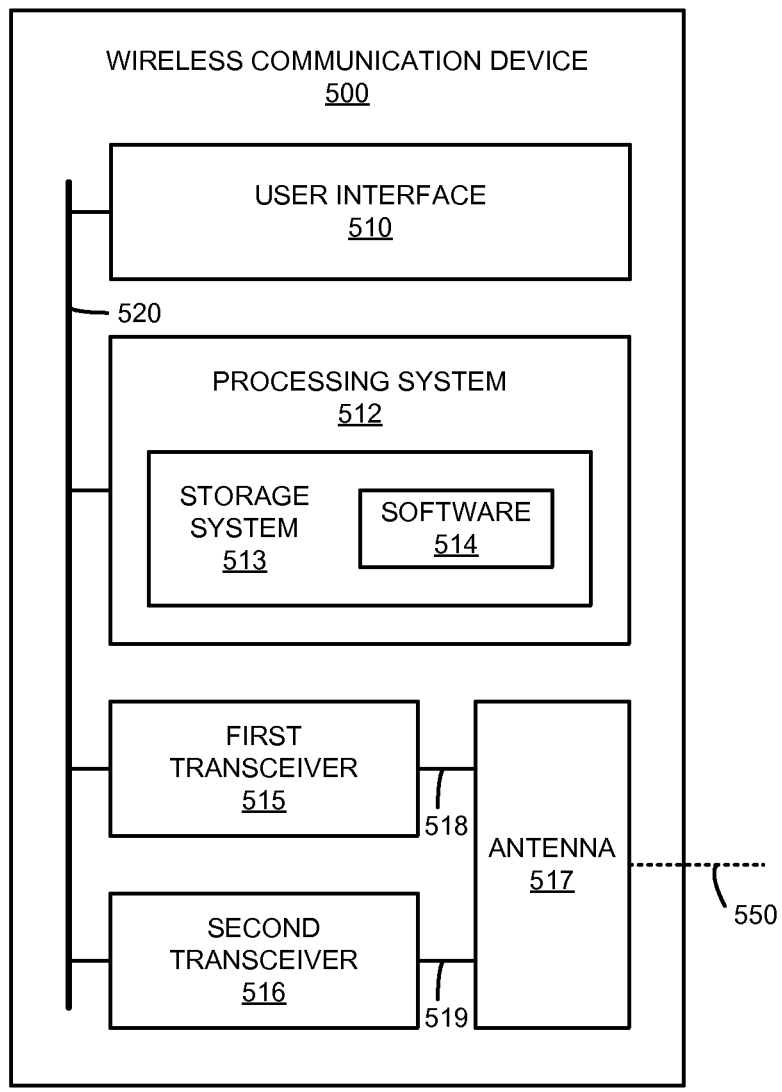
FIG. 5 is a block diagram illustrating a wireless communication device.

FIG. 5 is a block diagram illustrating wireless communication device 500, as an example of wireless communication device 110 found in FIG. 1 or wireless communication device 310 found in FIG. 3, although wireless communication devices 110 and 310 could use other configurations. Wireless communication device 500 includes user interface 510, processing system 512, first transceiver 515, second transceiver 516, and antenna 517. User interface 510, processing system 512, first transceiver 515, and second transceiver 516 communicate over bus 520. First transceiver 515 and antenna 517 communicate over link 518. Second transceiver 516 and antenna 517 communicate over link 519. Wireless communication device 500 may be distributed or consolidated among devices that together form elements 510 and 512-520.

User interface 510 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 510 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Processing system 512 includes storage system 513. Processing system 512 retrieves and executes software 514 from storage system 513. Processing system 512 could incorporate a computer microprocessor, logic circuit, or some other processing device, and may be distributed among multiple processing devices. Storage system 513 could include computer-readable media such as disks, tapes, integrated circuits, servers, or some other memory device, and also may be distributed among multiple memory devices. Software 514 may include an operating system, logs, utilities, drivers, networking software, and other software typically loaded onto a computer system. Software 514 could contain an application program, firmware, or some other form of computer-readable processing instructions. When executed by processing system 512, software 514 directs wireless communication device 500 to operate as described herein to at least receive overhead communication congestion information, determine tune away timers based upon overhead communication congestion information, enter different communication modes, instruct first transceiver 515 and second transceiver 516 to tune to different frequency spectrums, among other operations.

First transceiver 515 and second transceiver 516 each comprise radio frequency (RF) communication circuitry. First transceiver 515 and second transceiver 516 could also each include amplifiers, filters, modulators, and signal processing circuitry. In this example, each of first transceiver 515 and second transceiver 516 can exchange instructions and information with processing system 512 over bus 520. First transceiver 515 and second transceiver 516 also each communicate with wireless access systems, such as base stations, omitted for clarity, through antenna 517 over wireless link 550, to access communication services and exchange communications of the communication services, receive overhead communication congestion information, tune to frequency spectrums, and monitor network and paging information of a wireless access system, among other operations.

Antenna 517 includes an antenna or antenna array, and could include additional circuitry such as impedance matching elements, physical structures, wires, or other elements. Antenna 517 can exchange RF communications with each of first transceiver 515 and second transceiver 516 and may include multiplexing circuitry. Antenna 517 supports wireless communications over multiple frequency spectrums, and could include separate antenna elements for each frequency spectrum, although other configurations could be employed. Antenna 517 allows for communication of wireless communication device 500 over wireless link 550.

Wireless link 550 could use various protocols or communication formats as described herein for wireless links 140-141 and 340-341, including combinations, variations, or improvements thereof. Links 518-519 comprise wireline RF links in this example. Links 518-519 each exchange RF energy and communications between antenna 517 and each of first transceiver 515 and second transceiver 516. Links 518-519 could also include wires, waveguides, inductive coupling elements, near-field coupling elements, buffers, impedance matching elements, among other elements.

Bus 520 comprises a physical, logical, or virtual communication link, capable of communicating data, control signals, communications, and power, along with other information and signals. In some examples, bus 520 is encapsulated within any of elements 510 and 512-516, and may be a software or logical link. In other examples, bus 520 uses various communication media, such as air, space, metal, optical fiber, or some other signal propagation path, including combinations thereof. Bus 520 could be a direct link or might include various equipment, intermediate components, systems, and networks.

Referring back to FIG. 1, wireless communication device 110 comprises radio frequency (RF) communication circuitry and antenna elements. The RF communication circuitry typically includes amplifiers, filters, modulators, and signal processing circuitry. In many examples, wireless communication device 110 includes circuitry and equipment to exchange communications of multiple wireless communication services over multiple wireless links, or with multiple base stations. Wireless communication device 110 may also include user interface systems, memory devices, computer-readable storage mediums, software, processing circuitry, or other communication components. Wireless communication device 110 may be a user device, subscriber equipment, customer equipment, access terminal, telephone, mobile wireless telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be shown.

Wireless access node 120 comprises RF communication and control circuitry, antenna elements, and communication routing equipment and systems. The RF communication circuitry typically includes amplifiers, filters, RF modulators, transceivers, and signal processing circuitry. In many examples, wireless access node 120 includes equipment to provide wireless access and communication services over different communication modes to user devices, such as wireless communication device 110 shown in FIG. 1, as well as route user communications between core network 130 and wireless communication device 110, or provide network information or paging information to wireless communication device 110. Wireless access node 120 may also comprise data modems, routers, servers, memory devices, software, processing systems, cabling, network communication interfaces, physical structural supports, or other communication apparatuses. Wireless access node 120 may also comprise base stations, base transceiver stations, base station controllers (BSC), mobile switching centers (MSC), radio node controllers (RNC), or other communication equipment and apparatuses.

Core network 130 could include further wireless access systems, or could include base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Core network 130 may also comprise optical networks, asynchronous transfer mode (ATM) networks, packet networks, metropolitan-area networks (MAN), or other network topologies, equipment, or systems, including combinations thereof. In typical examples, core network 130 includes many wireless access systems and associated equipment for providing communication services to many user devices across a geographic region.

Wireless links 140-141 each use the air or space as the transport media. Wireless links 140-141 may each use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), Radio Link Protocol (RLP), or some other wireless communication format, including combinations, improvements, or variations thereof. Although two wireless links 140-141 are shown in FIG. 1, it should be understood that these separate wireless links are merely illustrative to show two communication modes or wireless access pathways for wireless communication device 110. In other examples, a single wireless link could be shown, with portions of the wireless link used for different communication modes, frequency spectrums, or user communication sessions, with associated paging or overhead communications.

Communication link 142 uses metal, glass, optical, air, space, or some other material as the transport media. Communication link 142 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 142 could be a direct links or may include intermediate networks, systems, or devices.

Links 140-142 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions. In many examples, the portion of wireless links 140-141 as transmitted by wireless communication device 110 is referred to an uplink or reverse link of the wireless link, while the portion as transmitted by wireless access node 120 is referred to as a downlink or forward link of the wireless link.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device, the method comprising:
    entering a first wireless communication mode with a wireless access node that requires tuning to a first frequency spectrum;
    receiving congestion information of the wireless access node for overhead communications of the first wireless communication mode;
    in response to entering the first wireless communication mode, setting a tune away timer based on the congestion information for periodically tuning to a second frequency spectrum of a second wireless communication mode to check for at least paging information;
    when the tune away timer expires, tuning away from the first frequency spectrum to the second frequency spectrum, monitoring for at least the paging information for the second wireless communication mode, and tuning back to the first frequency spectrum.

2. The method of claim 1, wherein the congestion information comprises control channel occupancy of the wireless access node for the overhead communications of the first wireless communication mode.

3. The method of claim 1, wherein the congestion information comprises paging congestion of the wireless access node for the first wireless communication mode.

4. The method of claim 1, wherein setting the tune away timer for monitoring the second wireless communication mode based on the congestion information comprises increasing the tune away timer when the congestion information indicates congestion above a congestion threshold.

5. The method of claim 1, wherein setting the tune away timer for monitoring the second wireless communication mode based on the congestion information comprises decreasing the tune away timer when the congestion information indicates congestion below a congestion threshold.

6. The method of claim 1, wherein the first wireless communication mode comprises an Evolution Data Optimized (EV-DO) wireless communication mode, and the second wireless communication mode comprises a Code Division Multiple Access (CDMA) single-carrier radio transmission technology (1xRTT) wireless communication mode.

7. The method of claim 6, wherein the congestion information comprises occupancy information for a forward link control channel of the wireless access node for the overhead communications of the EV-DO wireless communication mode.

8. The method of claim 1, wherein setting the tune away timer for monitoring the second wireless communication mode further comprises determining an application type of user communications over the first wireless communication mode and setting the tune away timer based on the application type and on the congestion information.

9. The method of claim 1, wherein setting the tune away timer for monitoring the second wireless communication mode further comprises determining a speed of motion of the wireless communication device, and setting the tune away timer based on the speed of motion of the wireless communication device and on the congestion information.

10. A wireless communication device, comprising:
    a processing system configured to enter a first wireless communication mode with a wireless access node that requires tuning a transceiver to a first frequency spectrum;
    the transceiver configured to receive congestion information of the wireless access node for overhead communications of the first wireless communication mode;
    in response to entering the first wireless communication mode, the processing system configured to set a tune away timer based on the congestion information for monitoring a second wireless communication mode by periodically tuning to a second frequency spectrum of the second wireless communication mode to check for at least paging information;
    when the tune away timer expires, the transceiver configured to tune away from the first frequency spectrum to the second frequency spectrum, and the processing system configured to monitor for at least the paging information for the second wireless communication mode and tune back to the first frequency spectrum.

11. The wireless communication device of claim 10, wherein the congestion information comprises control channel occupancy of the wireless access node for the overhead communications of the first wireless communication mode.

12. The wireless communication device of claim 10, wherein the congestion information comprises paging congestion of the wireless access node for the first wireless communication mode.

13. The wireless communication device of claim 10, wherein the processing system is configured to increase the tune away timer when the congestion information indicates congestion above a congestion threshold.

14. The wireless communication device of claim 10, wherein the processing system is configured to decrease the tune away timer when the congestion information indicates congestion below a congestion threshold.

15. The wireless communication device of claim 10, wherein the first wireless communication mode comprises an Evolution Data Optimized (EV-DO) wireless communication mode, and the second wireless communication mode comprises a Code Division Multiple Access (CDMA) single-carrier radio transmission technology (1xRTT) wireless communication mode.

16. The wireless communication device of claim 15, wherein the congestion information comprises occupancy information for a forward link control channel of the wireless access node for the overhead communications of the EV-DO wireless communication mode.

17. The wireless communication device of claim 10, wherein the processing system is configured to determine an application type of user communications over the first wireless communication mode and set the tune away timer based on the application type and on the congestion information.

18. The wireless communication device of claim 10, wherein the processing system is configured to determine a speed of motion of the wireless communication device, and set the tune away timer based on the speed of motion of the wireless communication device and on the congestion information.

* * * * *